United States Patent
Kong (10) Patent No.: US 8,932,038 B2
(45) Date of Patent: Jan. 13, 2015

(54) SEALING APPARATUS FOR FOAM INJECTION MOLD

(71) Applicants: Hyundai Motor Company, Seoul (KR); Kia Motors Corporation, Seoul (KR)

(72) Inventor: Byung Seok Kong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 74 days.

(21) Appl. No.: 13/867,391

(22) Filed: Apr. 22, 2013

(65) Prior Publication Data

US 2014/0161923 A1    Jun. 12, 2014

(30) Foreign Application Priority Data

Dec. 12, 2012  (KR) .......................... 10-2012-0144398

(51) Int. Cl.
*B29C 44/12* (2006.01)
*B29C 45/26* (2006.01)

(52) U.S. Cl.
CPC .................................. *B29C 45/2608* (2013.01)
USPC ............. 425/112; 425/4 R; 425/125; 425/127

(58) Field of Classification Search
CPC ............ B29C 44/1219; B29C 44/1233; B29C 44/146; B29C 45/2608
USPC .................. 425/4 R, 112, 125, 127, 556, 577
See application file for complete search history.

(56) References Cited

U.S. PATENT DOCUMENTS

| 4,692,108 | A | * | 9/1987 | Cesano .......................... 425/292 |
| 5,238,640 | A | * | 8/1993 | Masui et al. ................... 264/266 |
| 5,352,397 | A | * | 10/1994 | Hara et al. ..................... 264/153 |
| 5,679,301 | A | * | 10/1997 | Miklas et al. .................. 264/161 |
| 7,146,732 | B2 | * | 12/2006 | Bohm et al. ................... 29/897.2 |
| 2002/0121715 | A1 | * | 9/2002 | Sandefer et al. .............. 264/46.4 |
| 2004/0150127 | A1 | * | 8/2004 | Sandefer et al. .............. 264/46.6 |
| 2006/0220274 | A1 | * | 10/2006 | Dooley et al. ................. 264/259 |

FOREIGN PATENT DOCUMENTS

| JP | 07-195425 | 8/1995 |
| JP | 2002-166433 A | 6/2002 |
| KR | 10-2001-0088479 | 9/2001 |
| KR | 10-2004-0030774 | 4/2004 |
| KR | 10-2004-0083049 | 9/2004 |
| KR | 10-2005-0097466 | 10/2005 |

* cited by examiner

*Primary Examiner* — Robert B Davis
(74) *Attorney, Agent, or Firm* — Edwards Wildman Palmer LLP; Peter F. Corless (57) ABSTRACT

A sealing apparatus that includes a first mold in which a core is formed and a second mold in which a skin is formed which are combined to attach the core and the skin to seal a foaming space between the core and the skin. The apparatus further includes a slide mold installed to be moved horizontally in the first mold or the second mold to be moved forward by a restoring force of a support member to attach the skin to the core. The resilient support member is installed to support the slide mold and a position constraining member is coupled to the slide mold to release the constraint of the slide mold to allow the slide mold to be moved forward when the foaming space is sealed while the movement of the slide mold is constrained.

10 Claims, 5 Drawing Sheets

SEALING APPARATUS FOR FOAM INJECTION MOLD

CROSS-REFERENCE TO RELATED APPLICATION

This application claims under 35 U.S.C. §119(a) the benefit of Korean Patent Application No. 10-2012-0144398 filed Dec. 12, 2012, the entire contents of which are incorporated herein by reference.

BACKGROUND (a) Technical Field

The present invention relates to a sealing apparatus for a foam injection mold, and more particularly to a sealing apparatus that seals a foaming space between a core and a skin in a foam injection molding machine that manufactures a product having a foaming layer between the core and the skin.

(b) Background Art

In general, crash pads that protect a passenger during a vehicle collision accident and the like are installed on front inner sides of a driver seat and passenger seat as interior materials installed on a front side of an interior of a vehicle. The crash pad is manufactured to have an appealing surface in terms of external appearance while showing a resiliently cushioning performance and a property of absorbing an impact, using a foam material.

Generally, a crash pad for a vehicle includes a skin which is a skin material that provides an appealing surface, and a core that operates as a frame of the crash pad on an inner side of the skin. A foam layer, such as a polypropylene (PP) foam layer, a polyurethane (PU) foam layer, and the like, that provides a cushioning performance and an impact absorbing performance is interposed between the skin and the base.

FIGS. 1A to 1D are exemplary views showing processes for manufacturing a crash pad according to the related art. A core 1 is formed through polymer injection molding, a skin 2 is formed through vacuum absorption, and a foam layer 3 is formed through foaming. The processes will be described below.

Figure 1:
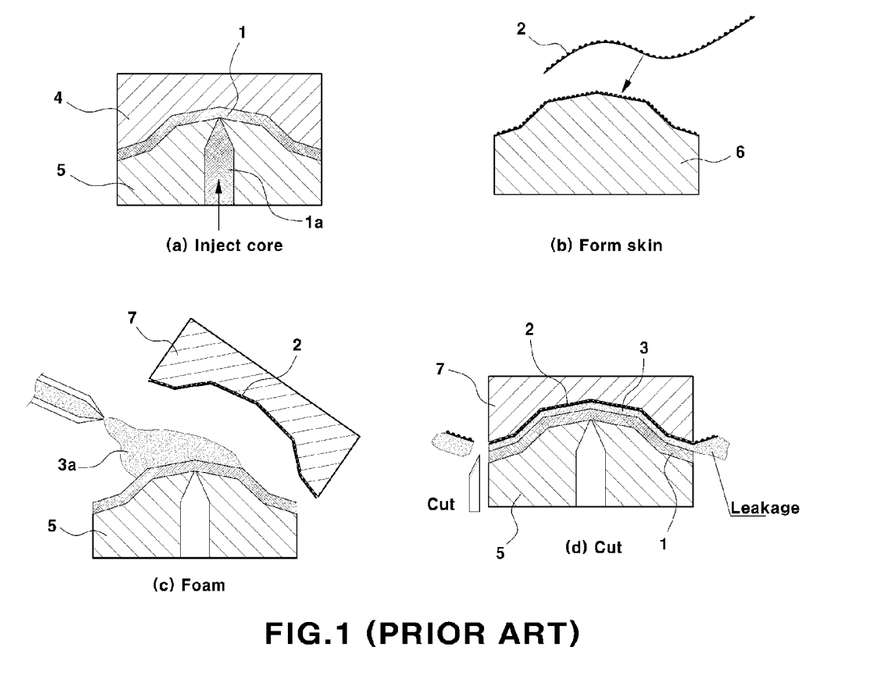
FIG. 1A to 1D are exemplary views showing processes for manufacturing a crash pad according to the related art.

First, the core 1 is formed by injecting a polymeric resin material 1a into an injection mold including an upper mold 4 and a lower mold 5 (FIG. 1A), and the skin 2 preheated in a male vacuum-forming mold 6 is inserted into the injection mold to be formed through vacuum absorption (FIG. 1B). In particular, although not shown in the drawings, fine vacuum apertures for vacuum absorbing the skin 2 are formed in the vacuum forming mold 6, and the vacuum apertures are connected to one passageway in the mold, and then is connected to an external large capacity vacuum pump.

Further, after a foaming liquid 3a is injected onto a core 1 of the lower mold 5, the foaming upper mold 7 to which the skin 2 is attached is closed and the skin 2 attached to the upper mold 7 is pressed and bonded onto the foaming liquid 3a of the lower mold 5. Thereafter, the skin 2 and an unnecessary marginal portion (e.g., a portion formed by the leaked foaming liquid and the like) of the foam layer 3 are cut off and removed together (e.g., trimmed), and an outer portion of the skin 2 is surrounded by the foam layer 3 and is bonded and fixed to the core 1 using an adhesive.

However, since the core 1, the skin 2, and the foam layer 3 are formed separately in different molds, a total of three molds (e.g., core injecting-molding upper and lower molds, a vacuum-forming mold, and a foaming upper mold) are required, which increases investment costs such as mold costs and manufacturing costs.

Further, since an outer portion of a cavity is opened even when the lower mold 5 and the foaming upper mold 7 is closed, the foaming liquid may leak through the opened outer portion (e.g., an excessive loss of the foaming liquid and an increase in manufacturing costs may be caused). Further, as shown in FIG. 1D, after the manufacturing process is completed, a separate process of cutting off a marginal portion formed by the leaked liquid and a marginal portion of the skin 2 or cutting off only the leaked portion, surrounding the cut portion with an outer portion of the skin 2, and bonding the outer portion of the skin 2 to the cut portion may be necessary.

Further, since the foaming liquid should be injected into the opened cavity space (e.g., foaming space), a temperature of the injected foaming liquid should be controlled and maintained within a defined temperature range, which may be difficult. Further, a minimum thickness of the foaming layer 3 should be designed to a uniform thickness of a predetermined thickness (e.g., 5 mm) or larger due to an early solidification of the foaming liquid in a structure in which the foaming space is opened and the foaming liquid leaks, which lowers a degree of freedom of the crash pad.

To solve the above disadvantages, a molding apparatus in which a vacuum forming mold and a foaming upper mold are integrated in a common mold and an outer portion of a skin is attached to a core by a slide mold to seal a foaming space has been developed, thus reducing the number of molds, costs, and the cost price, and reduces an excessive loss of the foaming liquid, and improves a degree of freedom of design of the crash pad.

Figure 2:
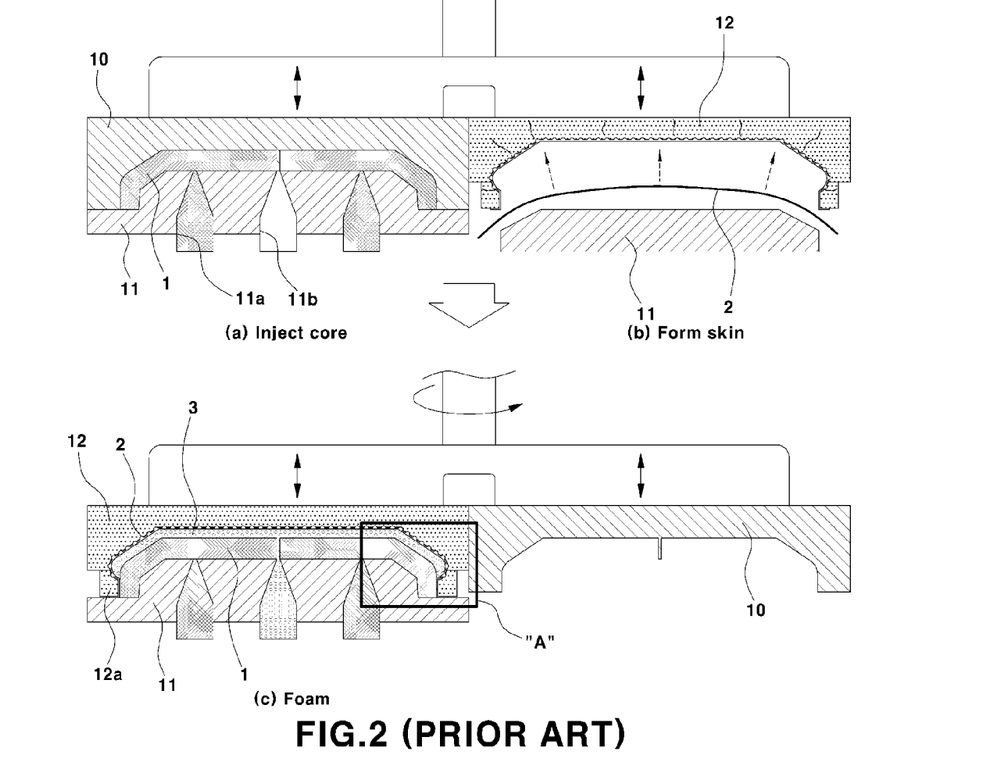
FIG. 2 is an exemplary schematic view showing a foam injection molding apparatus including a slide mold that prevents leakage of a foaming liquid according to the related art.

FIG. 2 is an exemplary schematic view showing a foam injection molding apparatus including a slide mold that prevents leakage of a foaming liquid according to the related art, and a crash pad can be manufactured through IMG foam injection molding in the shown crash pad manufacturing apparatus. In particular, an IMG (In-Mold Grain) foaming method refers to a method of forming an embossment (e.g., a protrusion or raised portion on the surface) on an inner surface of a mold (e.g., vacuum forming mold) to form a skin (e.g., formed of thermoplastic olefin (TPO)), and to form the skin through heating of the skin and suctioning of vacuum into a mold and forming an embossed shape (e.g., a raised shape) on a surface of the skin.

As shown, the core 1 is formed by injecting a resin into a mold while the core injecting molds 10 and 11 are combined with each other, and the skin 2 is vacuum absorbed in the vacuum forming mold 12 to be formed at the same time. Furthermore, the mold is rotated and fed by an upper rotation unit to combine the vacuum forming mold 12 in which the skin 2 is formed with the lower mold 11 in which the core 1 is formed, and then the foaming liquid is injected and foamed between the core 1 and the skin 2 to form the foam layer 3.

When the foaming liquid is injected, the slide mold 12a seals the foaming space by attaching a outer portion of the skin 2, and then the slide mold 12a moves forward by a distance suitable for sealing during the foaming operation and then is fixed to maintain the sealed state. The slide mold 12a moves rearward to eject a product after the foaming operation.

Figure 3:
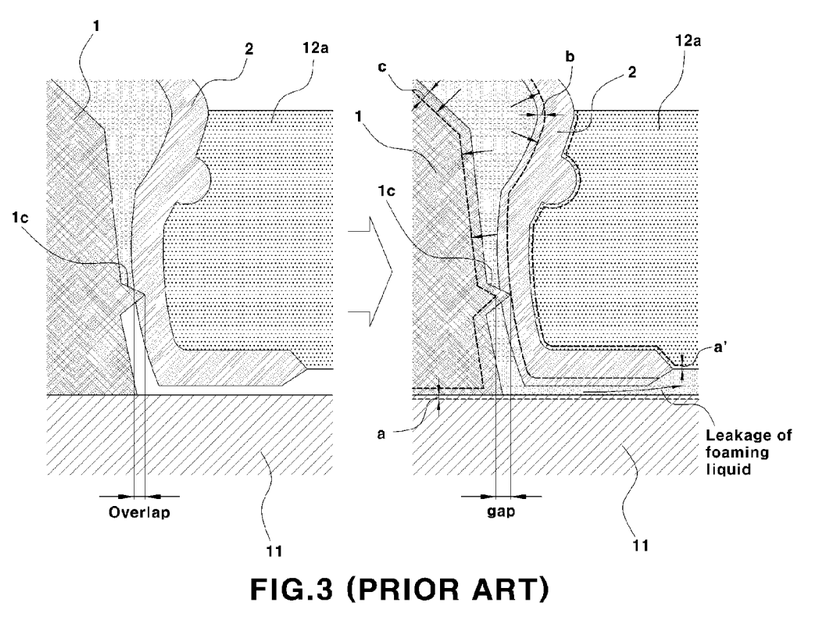
FIG. 3 is an exemplary view illustrating a disadvantage of the foam injection molding apparatus according to the related art.

Furthermore, as shown in FIG. 3, the sealing operation is performed while a sealing boss 1c formed in the core 1 overlaps the skin 2, and thus the foaming liquid may be prevented from being leaked to the exterior of the mold by the sealing boss 1c. The molding apparatus prevents leakage of a foaming liquid to some degree, and shares a mold, thereby reducing the number of molds, mold costs, invest costs, and the cost price.

However, to prevent leakage of the foaming liquid, an amount of the overlapping portion between the sealing boss 1c and the skin 2 should be maintained at a predetermined level (e.g., 0.3 mm) or higher and no gap should be generated between the sealing boss 1c and the skin 2. However, due to mold tolerances "a" and "a'" and contractions "b" and "c" of materials indicated in FIG. 3, a gap may be generated between the sealing boss 1c and the skin 2. Accordingly, the foaming liquid is leaked in the foaming process thus, the foaming pressure and foaming amount may not be secured, and the leaked foaming liquid may be stuck to the mold, bonding the product to the mold, causing difficulty in the ejection of the product.

SUMMARY

The present invention provides a sealing apparatus that removes a gap between a core and a skin due to a tolerance of a mold or contraction of a material during foam injection molding of a crash pad and the like, thus preventing leakage of a foaming liquid.

In accordance with an aspect of the present invention, a sealing apparatus of a foam injection mold may include a first mold in which a core is formed and a second mold in which a skin is formed that are combined with each other, wherein to seal a foaming space between the core and the skin. In particular, the sealing apparatus may include: a slide mold installed to be moved forward and rearward in the first mold or the second mold to be moved forward by a resilient restoring force of a support member to attach the skin to the core; the support member may be installed to support the slide mold; and a position constraining member may be coupled to the slide mold to release the constraint of the slide mold to allow the slide mold to be moved forward when the foaming space is sealed while the movement of the slide mold is constrained.

In an embodiment of the present invention, the slide mold may be installed to attach a outer portion of the core and an outer portion of the skin, the support member may be a spring, and the support member may provide a restoring force to overlap a sealing boss protruding from the core and the skin.

In another embodiment of the present invention, the position constraining member may include: a fixing member inserted and coupled into a coupling groove formed in the slide mold to release the constraint of the slide mold to allow the slide mold to be moved rearward or moved forward by a restoring force of the support member, and a drive mechanism that may be configured to move the fixing member.

In still another embodiment of the present invention, an inclined surface may be formed in the coupling groove and an inclined surface coupled to the inclined surface of the coupling groove may be formed in the fixing member to allow the slide mold to be moved forward and rearward while the two inclined surfaces are slid with respect to each other when the fixing member is moved.

In a further another embodiment of the present invention, the inclined surfaces of the coupling groove and the fixing member may be formed at a rear side of the slide mold with respect to a forward/rearward movement direction of the slide mold, and the slide mold may be supported by a spring located at a rear side of the mounting groove of the first mold or the second mold.

Thus, according to the sealing apparatus of the present invention, an outer portion of a foaming space may be sealed by moving the slide mold using a spring when a crash pad and the like is foam injection molded, and accordingly, a foaming liquid may be prevented from being leaked. In particular, a defined amount of overlapping portion may be maintained by removing a gap between the core and the skin due to a tolerance of the mold and contraction of a material, and leakage of the foaming liquid may be prevented.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an exemplary embodiment of the present invention will be described in detail with reference to the accompanying drawings so that those skilled in the art to which the present invention pertains can easily carry out the invention.

A sealing apparatus of the present invention injection may be configured to mold a core of a polymeric resin, vacuum form a skin, inject a foaming liquid between the formed core and the skin to form a foam layer, and manufacture a product having the foaming layer between the core and the skin. In particular, the product may be a crash pad, and the present invention may be applied to a molding apparatus that manufactures a crash pad through an IMG (In-Mold Grain) foam injection molding method.

Further, the foam injection molding apparatus to which the present invention is applied may include an upper mold and a lower mold that form a core as a resin that may be injected into a core forming space formed while the upper mold and the lower mold are combined with each other, and a vacuum forming mold that may be configured to vacuum form a skin (see FIG. 2).

Additionally, the foam injection molding apparatus may be a molding apparatus that forms a foaming space between a skin and a core of a lower mold when a vacuum forming mold to which a formed skin is attached and the lower mold are combined, the lower mold may include an injection passageway to inject a molten resin into the core forming space, and a foaming liquid injecting passageway to inject a foaming liquid into the foaming space to allow the lower mold to be used as a foaming mold together with the vacuum forming mold.

Further, the foam injection molding apparatus may be a molding apparatus in which a mold is rotated and fed by an upper rotation unit to alternately combine an upper mold that injects a core and a vacuum forming mold that forms a skin and foam with a lower mold. The configuration of the foam injection molding apparatus is not different from the one shown in FIG. 2, and a sealing apparatus that seals a foaming space to prevent leakage of a foaming liquid according to the present invention will be described in detail below.

Figure 4:
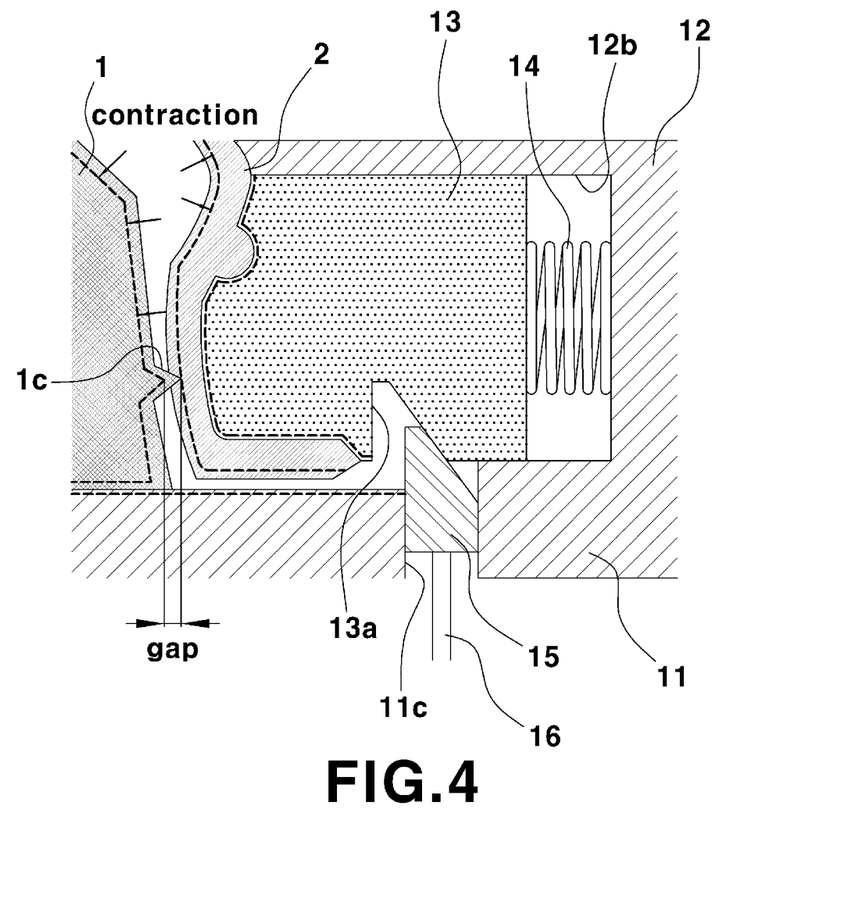
FIG. 4 is an exemplary sectional view showing a sealing apparatus according to an exemplary embodiment of the present invention.
Figure 5:
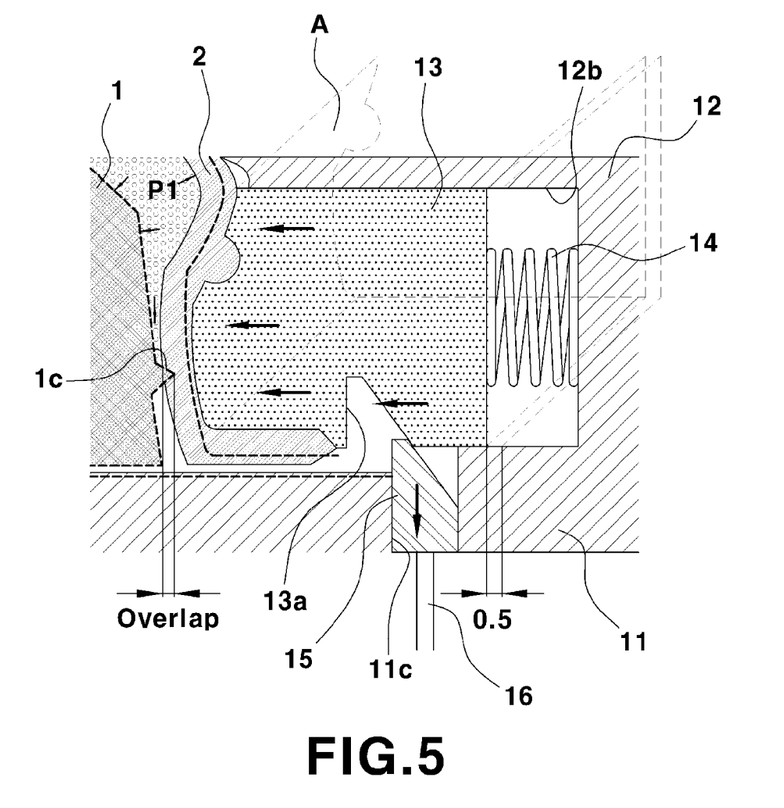
FIG. 5 is an exemplary operational state view of the sealing apparatus according to the exemplary embodiment of the present invention.

FIG. 4 is an exemplary sectional view showing a sealing apparatus according to an exemplary embodiment of the present invention. FIG. 5 is an exemplary operational state view of the sealing apparatus according to the exemplary embodiment of the present invention. The configuration of the sealing apparatus will be described below with reference to FIGS. 4 and 5.

FIG. 4 shows a state before a foaming liquid is injected during a foaming process, that is, the lower mold 11 in which the core 1 is formed and the upper mold are combined during a foaming process, (e.g., a state before a sealing operation of the sealing apparatus). Hereinafter, the lower mold 11 in which the core 1 is formed is referred to as a first mold and the vacuum forming mold 12 to which the skin 2 is attached is referred to as a second mold in the specification FIG. 5 shows a state in which a foaming liquid is injected and foamed while the first mold 11 and the second mold 12 are combined during a foaming process, and shows a state in which the foaming space is sealed by the sealing apparatus.

The sealing apparatus of the present invention may be configured to attach the skin 2 to the core 1 during the foaming process to seal a foaming space between the core and the skin, and may maintain a defined amount of overlapping portion between a sealing boss 1c of the core 1 and the skin 2 during the combination thereof while removing a gap between the core and the skin due to a mold tolerance and contraction of a material (e.g., removing a gap through a sealing operation even though the gap is generated).

In a description of the sealing apparatus, the sealing apparatus according to the embodiment of the present invention may include a slide mold 13 horizontally installed to be moved forward and rearward, and a support member 14 that supports the slide mold 13 at a rear side of the slice mold 13. In particular, as shown as an example, the support member 14 may be a coil spring installed to support the slide mold 13 in a mounting groove 12b in which the slide mold 13 may be installed at a rear side of the slide mold. Furthermore, the slice mold 13 may be moved forward by a force (in other words, a restoring force) of the spring 14 to attach the skin 2 to the core 1, while removing a gap between the core and the skin and maintaining a sealing state.

The slide mold 13 may be installed in the first mold 11 or installed in the second mold 12, and the embodiment of FIGS. 4 and 5 is an embodiment in which the slide mold 13 may be installed in the second mold 12 which is an upper mold (e.g., vacuum forming mold) during the foaming process. Further, the slide mold 13 may be a mold that attaches the skin 2 to the core 1 at an outer portion of the foaming space, and may be installed at an outer portion of the foaming space. Further, the slide mold 13 may be inserted into the mounting groove 12b formed in the first mold 11 or the second mold 12 and may be assembled to be supported by the spring 14, and since the slice mold 13 may be horizontally moved forward within the mounting groove 12b to seal a outer end portion of the foaming space, the slice mold 13 may include a plurality of divided molds along a circumference of the foaming space.

Additionally, a plurality of springs 14 may be installed along the slide mold 13, and a plurality of fixing members 15 may be installed along the slide mold. The spring may be a spring having a spring constant K of the following Equation 1.

$$K = S \times A \times P1 \div D \tag{1}$$

Here, S is a safety factor which is a preset value (e.g., 2), and as shown in FIG. 5, "A" represents a contact area between the slice mold 13 and the skin 12.

Further, as shown in FIG. 5, "P1" represents a foaming pressure applied in the foaming space and may be measured by a foam injector. Further, "D" is a preset distance required for attachment, based on contraction of a material, a calibration amount of gap due to a tolerance, and a predetermined amount of overlapping portion (e.g., 0.3 mm), and may be set a necessary movement distance by which the slide mold 13 is to be moved to satisfy a predetermined amount of overlapping portion while calibrating contraction of a material and a gap due to a tolerance of the mold.

Further, the sealing apparatus of the present invention may include a position constraining member coupled to the slide mold 13 to constrain movement of the slide mold 13, and release constraint of the slide mold to allow the slide mold to be moved forward by a force of the spring 14. The position constraining member may include a fixing member 15 inserted and coupled into a coupling groove 13a of the slide mold 13, and a drive mechanism driven in response to a control signal of a controller to move the fixing member.

In particular, as illustrated in FIGS. 4 and 5, the coupling groove 13a of the slide mold 13 may be a triangular recess wherein a rear side surface thereof may be a first inclined surface. Further, the fixing member 15 may have a structure in which a second inclined surface slid while being bonded to the first inclined surface formed in the coupling groove 13a of the slide mold 13 is formed at an upper portion thereof, and the fixing member 15 may be formed to have a triangular section.

The drive mechanism may be a driver that moves the fixing member 15 vertically, and may be a cylinder mechanism in which a piston rod 16 is operated horizontally within a cylinder body as the cylinder mechanism is driven and controlled by a control signal of the controller (not shown).

The fixing member 15 may be coupled to the piston rod 16 of the cylinder mechanism and mounted into the mounting aperture 11c of the first mold 11, and the fixing member 15 may be moved vertically by the cylinder mechanism within the mounting aperture 11c. Since the fixing member 15 is slidably coupled to the coupling groove 13a of the slide mold 13 through the inclined surface, the slide mold 13 may be horizontally moved forward and rearward when the fixing member 15 is moved vertically by the drive mechanism (e.g., cylinder mechanism). In other words, the front/rear locations of the slide mold 13 may be varied based on an upper/lower locations of the fixing member 15, and when the fixing member 15 is moved upward, the slide mold 13 may be moved rearward, compressing the spring 14 with the fixing member 15 while an inclined surface of the fixing member 15 and an inclined surface of the coupling groove 13a are slid.

In contrast, when the fixing member 15 is moved downward into the coupling groove 13a of the slide mold 13, the slide mold 13 may be moved forward by a restoring force of the spring 14. For example, when descending as in the states of FIGS. 4 and 5, the fixing member 15 may be configured to release constraint of the slide mold 13 to the state of FIG. 5 from the state of FIG. 4 while the slide mold 13 is slid with respect to the inclined surface of the fixing member 15, and then, the slide mold 13 may be moved forward by a force of the spring 14.

Furthermore, to vary the front/rear locations of the slide mold 13 based on the upward/downward movements of the fixing member 15, the opposite inclined surface may be formed in the coupling groove 13a of the slide mold 13, and a rear portion of the fixing member 15 to which the spring 14 is disposed with respect to a forward/rearward movement direction of the slide mold 13. Accordingly, when being moved forward by a force of the spring 14, the slide mold 13 may attach the skin 2 to the core 1 to seal a foaming space as shown in FIG. 5. As a result, even though the material is contracted and a gap due to a mold tolerance is generated after combination of the mold as in the state of FIG. 4, an amount of overlapping portion (e.g., between the sealing boss and the skin) intended by the attachment of the slide mold 13 due to the spring 14 may be maintained.

Further, when the slide mold 13 is installed in the second mold (e.g., vacuum forming mold) 12, when the second mold 12 is separated from the first mold 11, the slide mold 13 is separated from the fixing member 15 (e.g., the fixing member is completely withdrawn from the coupling groove of the slide mold), and when the slide mold 13 is disposed at a location moved forward further than the state of FIG. 4, while the spring 14 holds the slide mold 13, the fixing member 15 may be inserted into the coupling groove 13a when the mold is combined.

Accordingly, the slide mold 13 may be disposed at a location moved forward further than the state of FIG. 4 before the mold is combined, and accordingly, the fixing member 15 may be inserted into the coupling groove 13a of the slide mold 13 as in FIG. 4 after the mold is combined. Then, when the fixing member 15 descends as in FIG. 5, the slide mold 13 may be moved forward to allow the skin 2 to be attached to the core 1 to seal the foaming space.

Thereafter, after the foaming liquid may be injected to form a foam, the fixing member 15 may be raised by the drive mechanism (e.g., cylinder mechanism) to move the slide mold 13 rearward and the mold may be opened when a product is ejected.

Furthermore, when the slide mold 13 is installed in the first mold 11, which is a lower mold, during a foaming process, the slide mold 13 may be moved horizontally when the fixing member 15 is moved vertically while the fixing member 15 is inserted into the coupling groove 13a of the slide mold 13.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A sealing apparatus of a foam injection mold, comprising:
   a first mold in which a core is formed;
   a second mold in which a skin is formed is attached to the first mold to seal a foaming space between the core and the skin;
   a slide mold installed to be moved horizontally in the first mold or the second mold and to be moved forward by a restoring force of a support member to attach the skin to the core, wherein the support member is installed to support the slide mold; and
   a position constraining member coupled to the slide mold to release the constraint of the slide mold to allow the slide mold to be moved forward when the foaming space is sealed while the movement of the slide mold is constrained.

2. The sealing apparatus of claim 1, wherein the slide mold is installed to attach an outer portion of the core and an outer portion of the skin.

3. The sealing apparatus of claim 1, wherein the support member is a spring.

4. The sealing apparatus of claim 1, wherein the support member provides a restoring force to overlap a sealing boss protruding from the core and the skin.

5. The sealing apparatus of claim 4, wherein the support member is a spring having a spring constant of K in the following Equation (E1):

$$K = S \times A \times P1 \div D \qquad \mathrm{E1}$$

wherein, S is a safety factor, A is a contact area between the slide mold and the skin, P1 is a foaming pressure applied to the foaming space, and D is a necessary movement distance for satisfying a predetermined amount of overlapping portion.

6. The sealing apparatus of claim 1, wherein the position constraining member comprises:
   a fixing member inserted and coupled into a coupling groove formed in the slide mold to release the constraint of the slide mold to allow the slide mold to be moved horizontally by a restoring force of the support member; and
   a drive mechanism configured to move the fixing member.

7. The sealing apparatus of claim 6, wherein the drive mechanism is a cylinder mechanism in which a piston rod is coupled to a piston rod.

8. The sealing apparatus of claim 6, wherein a first inclined surface is formed in the coupling groove and a second inclined surface coupled to the first inclined surface of the coupling groove is formed in the fixing member to allow the slide mold to be moved horizontally while the two inclined surfaces are slid with respect to each other when the fixing member is moved.

9. The sealing apparatus of claim 8, wherein the inclined surfaces of the coupling groove and the fixing member are formed at a rear side of the slide mold with respect to a horizontal movement direction of the slide mold.

10. The sealing apparatus of claim 9, wherein the slide mold is supported by a spring located at a rear side of the mounting groove of the first mold or the second mold.

* * * * *